(12) United States Patent
Schwabl et al.

(10) Patent No.: US 11,897,168 B2
(45) Date of Patent: Feb. 13, 2024

(54) MIXING DEVICE WITH A PRESSURE HOLDING DEVICE

(71) Applicant: Henkel AG & Co. KGaA, Düsseldorf (DE)

(72) Inventors: Christian Schwabl, Bregenz (AT); Guenther Baldauf, Hohenweiler (AT); Mario Metzler, Lustenau (AT)

(73) Assignee: HENKEL AG & CO. KGAA, Düsseldorf (DE)

( * ) Notice: Subject to any disclaimer, the term of this patent is extended or adjusted under 35 U.S.C. 154(b) by 705 days.

(21) Appl. No.: 15/735,408

(22) PCT Filed: Jun. 24, 2016

(86) PCT No.: PCT/AT2016/050234
§ 371 (c)(1),
(2) Date: Dec. 11, 2017

(87) PCT Pub. No.: WO2017/004641
PCT Pub. Date: Jan. 12, 2017

(65) Prior Publication Data
US 2018/0178412 A1    Jun. 28, 2018

(30) Foreign Application Priority Data
Jul. 3, 2015    (AT) .................................. A 437/2015

(51) Int. Cl.
*B29B 7/76*    (2006.01)
*B29B 7/40*    (2006.01)
(Continued)

(52) U.S. Cl.
CPC ............ *B29B 7/7657* (2013.01); *B29B 7/407* (2013.01); *B29B 7/726* (2013.01); *B29B 7/7414* (2013.01);
(Continued)

(58) Field of Classification Search
CPC .................................................... B29B 7/7657
See application file for complete search history.

(56) References Cited

U.S. PATENT DOCUMENTS 3,169,833 A * 2/1965 Breer .................... B29B 7/7457
422/131
3,773,298 A * 11/1973 Gebert .................. B29C 45/231
366/181.8
(Continued)

FOREIGN PATENT DOCUMENTS

CN    1344612    4/2002
CN    1681630    10/2005
(Continued)

OTHER PUBLICATIONS

International Search Report dated Sep. 26, 2016 in International (PCT) Application No. PCT/AT2016/050234.
(Continued)

*Primary Examiner* — Irina Krylova
(74) *Attorney, Agent, or Firm* — Wenderoth, Lind & Ponack, L.L.P.

(57) ABSTRACT

The invention relates to a mixing device comprising at least one supply opening for at least one liquid and comprising at least one additional supply opening for at least one liquid curing or crosslinking agent. The liquid and/or the liquid curing or crosslinking agent is/are mixed with a gas. The mixing device also comprises a discharge opening for discharging a mixture, which can be produced in the mixing device, of the at least one liquid and the at least one liquid curing or crosslinking agent. A pressure holding device is provided for holding a specifiable pressure which is higher than the pressure at which the gas in the mixing device is foamed.

2 Claims, 5 Drawing Sheets

(51) Int. Cl.
  *B29B 7/72* (2006.01)
  *B29B 7/74* (2006.01)
  *B29B 7/86* (2006.01)
  *C08G 18/74* (2006.01)
  *C08G 18/73* (2006.01)
  *C08G 18/42* (2006.01)
  *C08G 18/48* (2006.01)
  *C08J 3/24* (2006.01)
  *B29K 105/04* (2006.01)
  *B29K 105/24* (2006.01)
  *C08G 101/00* (2006.01)
  *C08J 9/30* (2006.01)

(52) U.S. Cl.
  CPC .............. *B29B 7/86* (2013.01); *C08G 18/42* (2013.01); *C08G 18/4244* (2013.01); *C08G 18/48* (2013.01); *C08G 18/73* (2013.01); *C08G 18/74* (2013.01); *C08J 3/24* (2013.01); *B29K 2105/04* (2013.01); *B29K 2105/24* (2013.01); *C08G 2101/00* (2013.01); *C08G 2115/02* (2021.01); *C08J 9/30* (2013.01); *C08J 2201/022* (2013.01); *C08J 2203/06* (2013.01); *C08J 2331/02* (2013.01); *C08J 2333/04* (2013.01); *C08J 2363/00* (2013.01); *C08J 2367/00* (2013.01); *C08J 2375/04* (2013.01); *C08J 2383/04* (2013.01)

(56) References Cited

U.S. PATENT DOCUMENTS

| | | | |
|---|---|---|---|
| 4,368,847 A * | 1/1983 | Ersfeld | B29B 7/60 239/125 |
| 4,753,534 A * | 6/1988 | Markle | B01F 15/00681 366/279 |
| 5,098,267 A * | 3/1992 | Cheng | B29B 7/7414 425/4 R |
| 5,439,633 A * | 8/1995 | Durina | B29B 7/428 264/328.17 |
| 5,874,031 A | 2/1999 | Okuda et al. | |
| 5,891,955 A | 4/1999 | Mariani et al. | |
| 5,902,042 A | 5/1999 | Imaizumi et al. | |
| 5,938,079 A | 8/1999 | Wacker et al. | |
| 5,945,479 A | 8/1999 | Mariani et al. | |
| 5,984,280 A | 11/1999 | Okuda et al. | |
| 6,107,400 A | 8/2000 | Mariani et al. | |
| 6,538,040 B1 | 3/2003 | Okuda et al. | |
| 6,592,249 B1 | 7/2003 | Hausbichler et al. | |
| 6,635,200 B2 | 10/2003 | Sulzbach et al. | |
| 7,230,037 B2 | 6/2007 | Sulzbach et al. | |
| 7,338,980 B2 | 3/2008 | Okuda et al. | |
| 7,375,841 B1 | 5/2008 | Polis et al. | |
| 7,703,705 B2 | 4/2010 | Ganzer | |
| 7,850,049 B2 | 12/2010 | Ciavarella et al. | |
| 8,409,700 B2 | 4/2013 | Morhenn et al. | |
| 9,038,921 B2 | 5/2015 | Ganzer | |
| 10,086,341 B2 | 10/2018 | Mader | |
| 2002/0027306 A1 | 3/2002 | Sulzbach et al. | |
| 2002/0030854 A1 | 3/2002 | Schutz et al. | |
| 2002/0132859 A1 | 9/2002 | Okuda et al. | |
| 2004/0198870 A1 | 10/2004 | Sulzbach et al. | |
| 2005/0029304 A1 | 2/2005 | Okuda et al. | |
| 2008/0197209 A1 | 8/2008 | Ganzer | |
| 2009/0188944 A1 | 7/2009 | Ciavarella et al. | |
| 2010/0163640 A1 | 7/2010 | Ganzer | |
| 2010/0330355 A1 | 12/2010 | Morhenn et al. | |
| 2015/0055434 A1 | 2/2015 | Mader | |
| 2018/0194037 A1 * | 7/2018 | Schwabl | B29B 7/60 |

FOREIGN PATENT DOCUMENTS

| | | |
|---|---|---|
| CN | 101306332 | 11/2008 |
| CN | 101492109 | 7/2009 |
| CN | 104159675 | 11/2014 |
| CN | 203955057 | 11/2014 |
| DE | 1 504 654 | 5/1969 |
| DE | 1 779 667 | 9/1971 |
| DE | 2 125 679 | 12/1972 |
| DE | 2419961 | 11/1975 |
| DE | 44 33 593 | 6/1995 |
| DE | 19848357 | 4/2000 |
| DE | 10 2008 011 986 | 9/2009 |
| DE | 10 2011 009 034 | 7/2012 |
| DE | 10 2012 002 047 | 9/2012 |
| EP | 0 723 816 | 7/1996 |
| EP | 0 776 745 | 6/1997 |
| GB | 986814 | 3/1965 |
| JP | 08-229939 | 9/1996 |
| JP | 08-267447 | 10/1996 |
| JP | 10-29213 | 2/1998 |
| JP | 2002-527261 | 8/2002 |
| JP | 2008-184605 | 8/2008 |
| KR | 10-2014-0138339 | 12/2014 |
| RU | 2118931 | 9/1998 |
| SU | 891450 | 12/1981 |
| SU | 1214440 | 2/1986 |
| WO | 92/14595 | 9/1992 |
| WO | 2004/033173 | 4/2004 |
| WO | 2013/149273 | 10/2013 |

OTHER PUBLICATIONS

Search Report dated Feb. 26, 2016 in Austrian Application No. A 437/2015, with English translation.

Search Report dated Apr. 2, 2019 in corresponding Chinese Patent Application No. 201680038087.9 with English translation.

* cited by examiner

MIXING DEVICE WITH A PRESSURE HOLDING DEVICE

The present invention concerns a mixing device having the features of the classifying portion according to a first aspect of the invention and a method of producing a foamed material having the features of the classifying portion according to a second aspect of the invention.

Foamed material which have many possible use options can be produced with a method of the general kind set forth, using a mixing device of the general kind set forth. For example the foamed materials involve seals.

DE 2 125 679 discloses a device for mixing and ejecting fluid multi-component plastics which harden rapidly after mixing. That device has a mixing chamber with an agitator disposed therein. An outlet portion of the mixing chamber is arranged displaceably with respect to a central portion of the mixing chamber against a return force. The outlet portion is opened by the pressure of material in the interior of the mixing chamber or by separate actuation, whereupon the agitator starts to run and mixes the plastic material which is freshly passing into the mixing chamber. After the conclusion of an ejection process the mixing chamber is to remain completely filled with plastic in order to prevent air from being stirred in and thus to prevent mixing of the plastic material with air as that would detrimentally influence the quality of the plastic components to be produced.

EP 776 745 B1 discloses a method in which a viscous liquid is pre-mixed with gas and then mixed in a mixing device with a curing agent (see FIG. 7 of that specification). A problem in that respect is that outgassing of the gas out of the viscous liquid can occur in the mixing device so that the mixture of the viscous liquid mixed with gas and the curing agent, after expansion, can no longer enjoy the desired properties or can also detrimentally affect expansion itself.

DE 1 779 667 A discloses a mixing device in which an agitator is of a two-part construction, wherein the two parts are biased relative to each other by a spring so that, when a pressure prevailing in the mixing device is exceeded, the spring is compressed and the discharge opening is opened. That is intended to prevent subsequent dripping. This arrangement does not ensure that the pressure in the mixing device always remains above a value at which the gas is reliably prevented from foaming out in the mixing device.

The object of the invention is to provide a mixing device and a method in which the above-described problems are avoided.

That object is attained by a mixing device having the features according to the first aspect of the invention and a method having the features according to the second aspect of the invention.

By virtue of the pressure holding device it is possible to predetermine in the mixing device such a pressure that outgassing of the gas out of the at least one liquid and/or out of the at least one liquid curing or cross-linking agent or out of the mixture of liquid and curing or cross-linking agent is prevented. In that respect, that predeterminable pressure at which degassing of the gas out of the at least one liquid and/or out of the liquid curing or cross-linking agent is avoided can be ascertained by trials.

Advantageous embodiments of the invention are defined in the appendant claims.

The at least one liquid can preferably be a viscous liquid. Examples of the at least one liquid are polyols, silicones, epoxy, polyester, acrylates and MS-polymers.

Examples of the gas with which the liquid and/or the liquid curing or cross-linking agent is or are mixed are air, nitrogen and carbon dioxide.

An example of the curing agent is isocyanate.

Examples of the cross-linking agent are silicones.

Further examples of systems comprising at least two components are:
- addition cross-linking silicone with silicone as liquid and silicone as addition cross-linking cross-linking agent,
- condensation cross-linked silicone for example with water and/or glycols, or in accordance with DE 10 2008 011 986 A1 with silicone as viscous liquid and water and/or glycols as condensation cross-linking cross-linking agent,
- polyurethane (result) cross-linked with isocyanate as curing agent. The polyol component as liquid can contain for example polyester polyols, polyether polyols, thiols, glycols, amines, chain lengtheners and acrylates. The isocyanates can be aromatic (for example on an MDI, TDI basis) and aliphatic (for example on an HDI, IPDI, 12 times hydrated MDI basis),
- polyisocyanorates, the second component contains trimerisation catalysts and possibly also polyols, other substances with active hydrogen or non-reactive thinners,
- 1K NCO terminated polyurethanes with water and/or glycols as curing or cross-linking agents (booster systems),
- epoxy resin systems,
- silane-modified polymers with water and/or glycols in the B component, for example MS polymers,
- acrylates, radically hardened,
- unsaturated polyester resins, radically hardened,
- vinylester resins, radically hardened.

In the simplest case the pressure which can be predetermined by the pressure holding device can be produced by an aperture which is arranged in the region of the discharge opening or a fixed counteracting means which limits the accessible region of the discharge opening to a gap. The dimensioning of the aperture or the gap, that is required for a desired pressure, can be established by trials or calculations.

It is preferably provided that the pressure which can be predetermined by the pressure holding device is variable by means of an adjusting device, preferably being adjustable in steps or steplessly. It is possible in that way to react to different amounts of gas mixed with the liquid and/or the liquid curing or cross-linking agent and to different discharge amounts from the discharge opening. It may however also be sufficient for the pressure holding device to be adjusted once to a given pressure which is then no longer altered.

As an alternative to the variability by an adjusting device it is possible to provide an interchangeable aperture for the discharge opening involving different aperture diameters or an interchangeable nozzle which can be connected to the discharge opening, involving different lengths and/or inside diameters.

It is preferably provided that the pressure holding device includes an adjusting member which is arranged displaceably in the mixing device relative to the discharge opening and by which a gap remaining between the adjusting member and the discharge opening and thus the pressure produced by the pressure holding device can be adjusted. Depending on the respective size of the gap the pressure in the mixing device is different, wherein a smaller gap is linked to a higher pressure in the mixing device. In this embodiment the pressure holding device is formed by the gap formed between the adjusting member and the discharge opening, upon the introduction of material into the mixing device.

It is particularly preferably provided that the mixing device has an agitator for mixing the at least one liquid and the at least one liquid curing or cross-linking agent. In this case the mixing device can be referred to as a dynamic mixing device.

If an agitator is provided the agitator itself can be adapted to be displaceable and can form the adjusting member.

It is preferably provided that the displaceable adjusting member is biased in the direction of the discharge opening by a force storage means. In that way it is possible to automatically react to fluctuations in the viscosity of the mixture of liquid and curing or cross-linking agent and changes in the discharge amount, in such a way that the pressure in the mixing device remains substantially constant. The force storage means can be in the form of a mechanical spring, a compressed air spring, a hydraulic piston-cylinder unit, an additional mass which loads the adjusting member due to the force of gravity, an electric drive (for example a linear drive) or the like.

Preferably there is provided a device for adjusting the strength of the force storage means. In the case of a mechanical spring this can involve for example a displaceable abutment for the spring. The pressure can be adjusted directly in the case of the compressed air spring or the hydraulic piston-cylinder unit.

In the empty condition of the mixing device the force storage means is preferably so dimensioned that the discharge opening is closed by the adjusting member. By virtue of the material which is introduced into the mixing device by way of the feed openings, the adjusting member is moved away from the discharge opening against the force applied by the force storage means, thereby forming a gap. The extent of the movement away from the discharge opening is adjustable by the device for adjusting the strength of the force storage means.

As an alternative to the displaceable adjusting member it can be provided that the discharge opening is displaceable relative to an axially stationary means, preferably an agitator, for adjusting the gap remaining between the discharge opening and the axially stationary means. In this case the pressure holding device includes the axially stationary means and the discharge opening which is displaceable relative to the axially stationary means.

If the mixing device is of an elongated configuration it may be advantageous if the at least one feed opening for the at least one liquid and the at least one further feed opening for the at least one liquid curing or cross-linking agent are arranged at different axial positions of the mixing device. Because mixing of the liquid with the liquid curing or cross-linking agent occurs first in the region of that feed opening which is closer to the discharge opening no or only slight contamination occurs in the region disposed axially above same.

It can be provided that the discharge opening of the mixing device is connected to a nozzle.

It can be provided that the gas in the liquid and/or in the liquid curing or cross-linking agent is present in at least partially dissolved condition.

Protection is also claimed for an arrangement comprising a mixing device according to at least one of the preceding embodiments and a source for at least one liquid, that is connected to the at least one feed opening for the at least one liquid, wherein preferably the at least one liquid is mixed with a gas, and a source for at least one liquid curing or cross-linking agent, that is connected to the at least one further feed opening for the at least one liquid curing or cross-linking agent, wherein preferably the at least one liquid curing or cross-linking agent is mixed with a gas.

BRIEF DESCRIPTION OF THE DRAWINGS

Embodiments of the invention are discussed with reference to the Figures in which.

DETAILED DESCRIPTION OF PREFERRED EMBODIMENTS

Figure 1A:
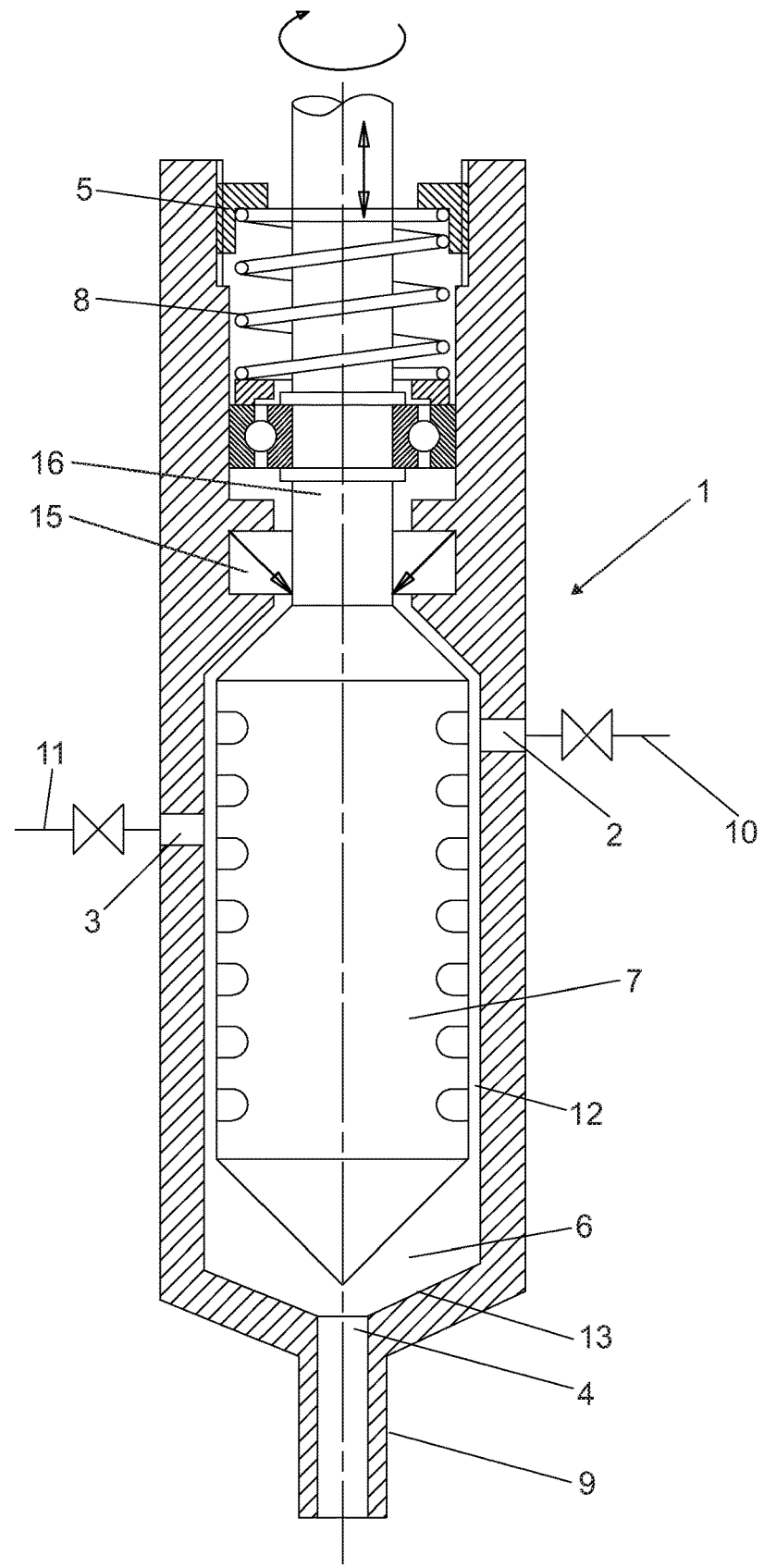
FIGS. 1a through 1c show a first embodiment of a mixing device according to the invention with different variants in detail views.

FIG. 1a shows a mixing device 1 having a mixing chamber 12. The Figure shows a feed opening 2 for at least one viscous liquid mixed with gas (for example polyol mixed with air) and a further feed opening 3 for at least one liquid curing or cross-linking agent (for example isocyanate), which lead into the mixing chamber 12. In this embodiment the mixing device 1 is a dynamic mixing device and includes an agitator 7 which is rotatable in the mixing chamber 12. Differently from what is described herein in addition to the liquid or instead of the liquid the liquid curing or cross-linking agent can additionally be mixed with a gas—for example air.

Provided adjacent to the tip of the agitator 7 is a discharge opening 4 through which the mixture produced in the mixing chamber 12 and comprising the at least one viscous liquid mixed with gas and the liquid curing or cross-linking agent can be discharged in the direction of a nozzle 9.

In the present embodiment the pressure conditions are so selected that downstream of the discharge opening 4 there is a reduction in the pressure of the mixture comprising the at least one viscous liquid mixed with gas and the liquid curing or cross-linking agent, below that pressure at which the gas foams out in the mixture so that outgassing of the gas results in expansion and thus foaming of the mixture (physical foaming).

In this embodiment the pressure holding device is formed by the agitator 7 which is acted upon by way of a force storage means 8 and which is arranged spaced from the discharge opening 4 by a gap 6.

To produce the mixture comprising the at least one viscous liquid mixed with gas and the liquid curing or cross-linking agent the viscous liquid which is mixed with gas and which is provided by a source 10 is introduced through the first feed opening 2 and the liquid curing or cross-linking agent which is provided by a further source 11 is introduced through the second feed opening 3, at different axial positions of the mixing device 1 which here is of an elongated configuration. Mixing of those two components takes place by means of the rotating agitator 7.

In the preferred embodiment illustrated here the force storage means 8 is provided in the form of a spring which presses the agitator 7 against an end face 13 of the mixing chamber 12, that has the discharge opening 4, until sufficient force is applied to the agitator 7 by the material introduced from the sources 10 and 11, so that the agitator 7 moves away from the end face 13 and as a result a gap 6 (here an annular gap) is formed between the end face 13 and the agitator 7, whereby the mixture produced in the mixing chamber 12 can issue from the discharge opening 4. The force applied in the direction of the discharge opening 4 by the force storage means 8 is of such a magnitude that, due to the backup of the material mixture in the region of the gap 6, there is a pressure which is propagated over the mixing chamber 12 and which prevents outgassing of the gas from the mixture of the gas with the viscous liquid.

If fluctuations occur in the material backup (for example as a consequence of a variation in the discharge amount, a fluctuating viscosity of the mixture, temperature fluctuations, fillers in the mixture and so forth), the position of the agitator 7 is automatically adapted relative to the discharge opening 4 so that the pressure in the mixing chamber 12 is kept substantially constant. A seal 15 (which here is shown only as acting in one direction but which can also have a sealing action in both directions) sealingly surrounds the rotating shaft 16 of the agitator 7 and seals off the mixing chamber 12 in the region of the shaft 16 of the agitator 7. The seal 15 can for example comprise Teflon and can permit smooth axial movement of the rotating shaft 16. By virtue of the fact that the shaft 16 rotates and the seal 15 causes slight friction, it is possible to achieve very fine axial positional adaptation of the agitator 7. In particular it is possible in that way to avoid unwanted pressure fluctuations due to abrupt axial displacement of the agitator 7 as a consequence of a stick-slip effect. The axial displacement of the agitator 7 is also facilitated by the rotation of the shaft 16. Preferably the seal 15 is in the form of a rotational and translational seal.

In the illustrated embodiment the biasing of the force storage means 8 can be adjusted. In this example provided for that purpose is an adjusting device 5 in the form of a screw sleeve, which is adapted to act as an abutment for the spring and which is axially displaceable by a rotary movement.

Unlike the illustrated situation an embodiment is also conceivable in which there is no force storage means 8 and the gap 6 between the discharge opening 4 and the agitator 7 is fixedly set. In that embodiment it is not possible to react to fluctuations in the material backup. A further embodiment (not shown) could be of such a configuration that a force storage means 8 is admittedly provided, but it is structurally biased to a predetermined degree. In this case also there cannot be any variation.

Figure 1B:
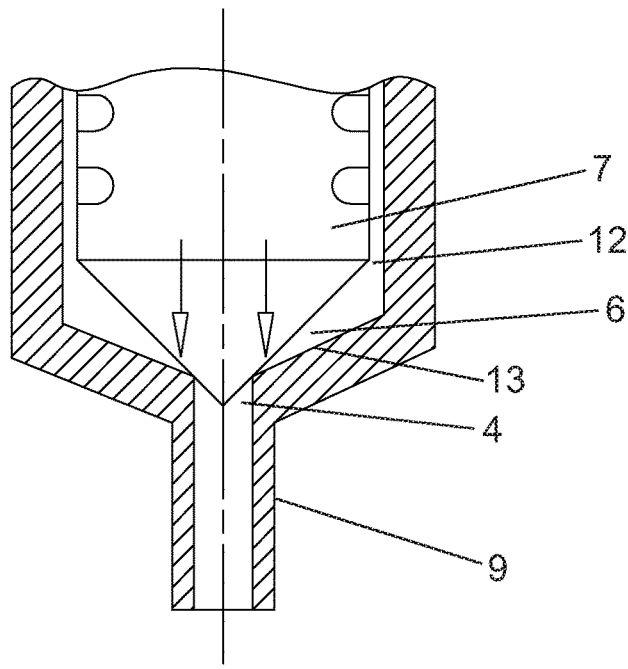

FIG. 1*b* shows a detail view of the tip of the agitator 7 which in this embodiment is more pointed than the inclination of the end face 13 of the mixing chamber 12. As a result the tip of the agitator 7 only bears in annular relationship against the end face 13 and projects into the discharge opening 4 in order to close it off in an annular shape.

Figure 1C:
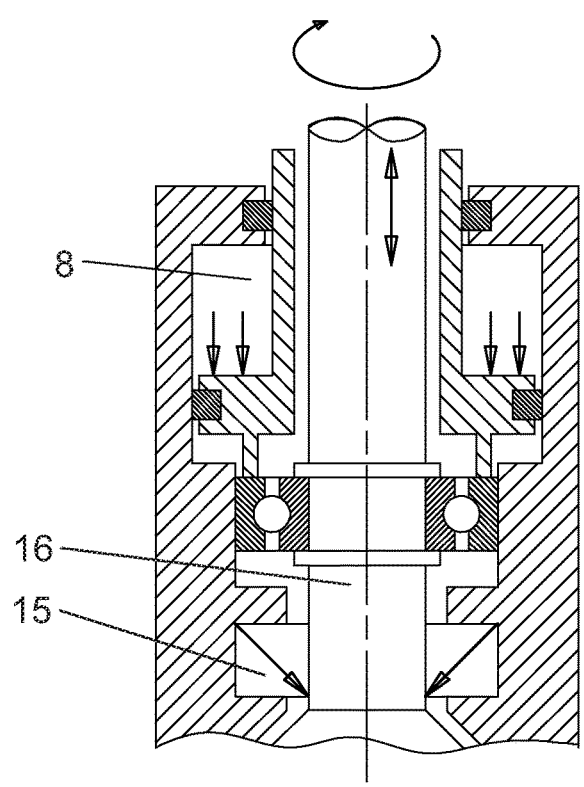

FIG. 1*c* shows a variant of the embodiment in which the force storage means 8 is in the form of a compressed air spring. A variant is also further conceivable in which the force storage means 8 is in the form of a hydraulic piston-cylinder unit.

Unlike FIGS. 1*a* through 1*c* FIG. 2 shows an embodiment in which it is not the agitator 7 that is arranged displaceably in the mixing chamber 12, but the end wall of the mixing chamber 12, in the end face 13 of which the discharge opening 4 is arranged, is displaceable relative to the agitator 7 in order once again to adjust the gap 6 between the discharge opening 4 and the agitator 7. All those variants which were shown for the embodiment of FIG. 1*a* are also possible for the embodiment of FIG. 2.

Figure 3A:
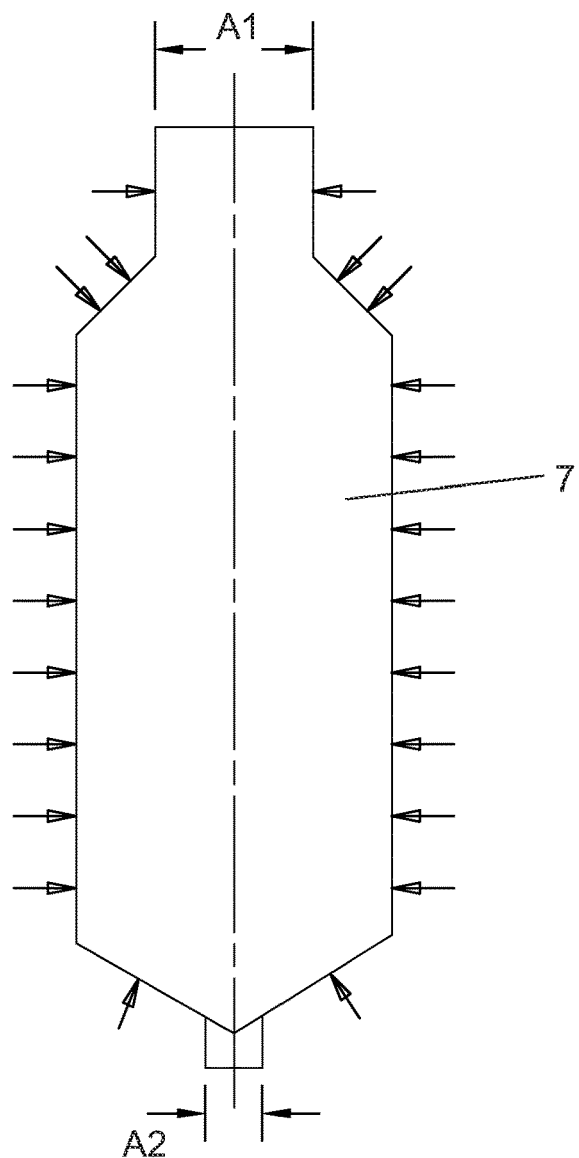
FIGS. 3a and 3b show an agitator illustrating forces acting on the agitator.
Figure 3B:
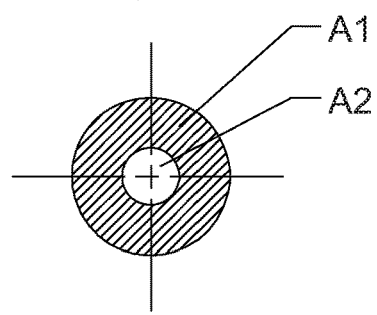

FIG. 3*a* shows an agitator 7. The forces exerted on the agitator 7 by the material introduced into the mixing chamber 12 (those forces being illustrated by arrows facing towards the agitator 7) cancel each other out except for the regions A1 (sealed region of the agitator 7) and A2 (substantially pressure-less region through which the material can be discharged from the discharge opening 4). There is a pressure in the mixing chamber 12 which very substantially corresponds to the force exerted by the force storage means 8 divided by the difference between those two surfaces A1 and A2 (see FIG. 3*b*).

Figure 2:
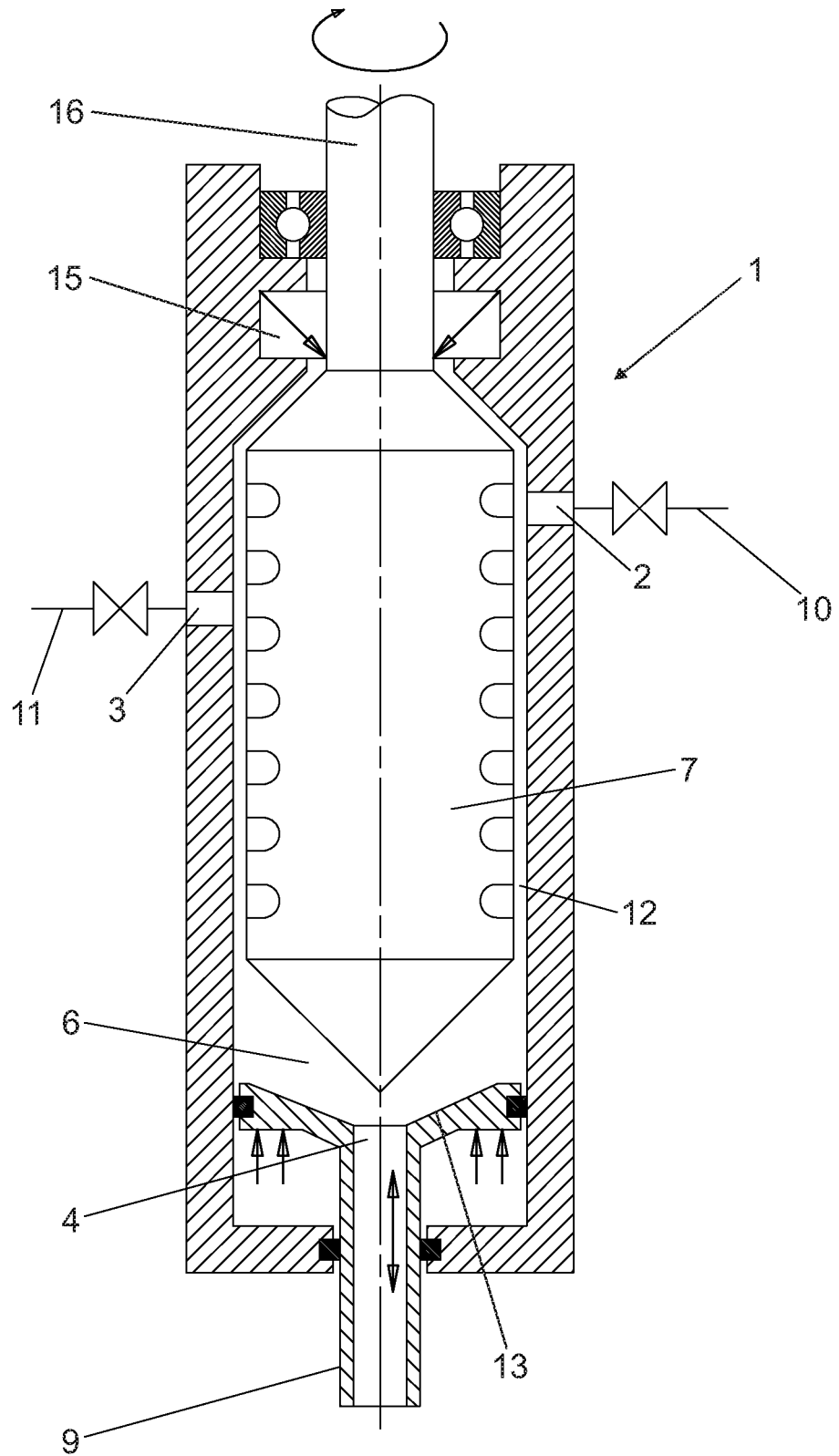
FIG. 2 shows a second embodiment of a mixing device according to the invention.
Figure 4:
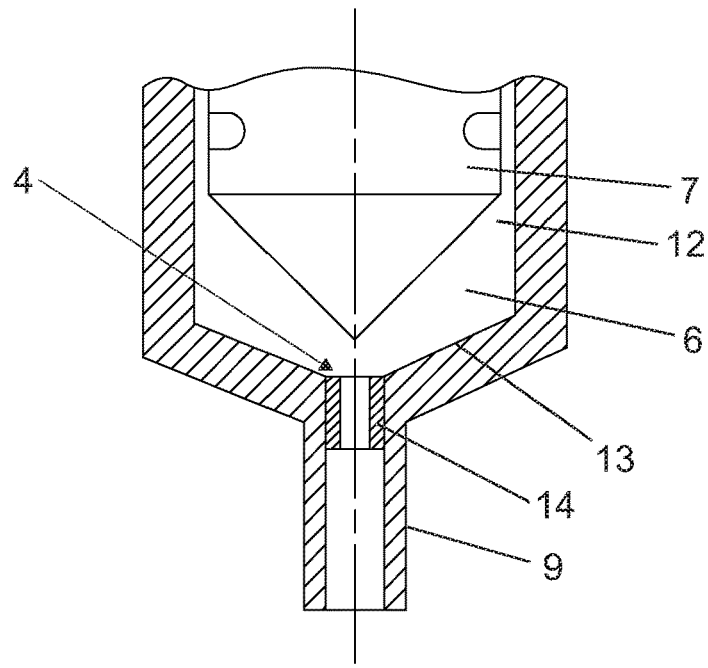
FIGS. 4 and 5 show detail views of further embodiments of proposed mixing devices.
Figure 5:
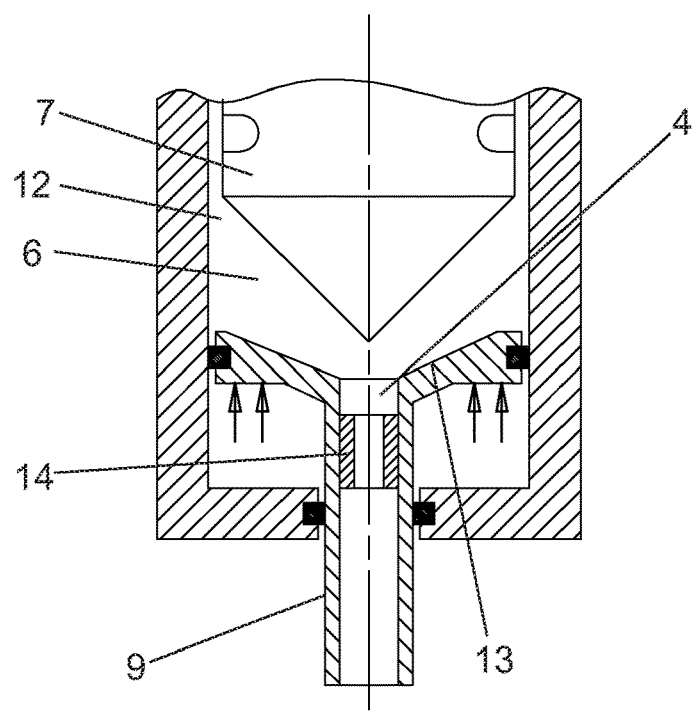

FIG. 4 shows a further example of a pressure holding device for a mixing device 1 as shown in FIG. 1*a* and FIG. 5 shows a further example of a pressure holding device for a mixing device 1 as shown in FIG. 2. In both cases the pressure holding device is formed by an aperture 14 and an agitator 7 which is arranged spaced from the discharge opening 4 by a gap 6. The pressure which can be predetermined by these pressure holding devices can be respectively produced by the aperture 14 arranged in the region of the discharge opening 4. The dimensioning of the aperture 14, that is required for the desired pressure, can be established by trials or calculations. That permits the pressure holding device to be of a particularly simple structure, in which it is possible in particular to dispense with an adjusting device 5.

LIST OF REFERENCES

1 mixing device
2 feed opening for at least one viscous liquid mixed with gas
3 further feed opening for at least one liquid curing or cross-linking agent
4 discharge opening
5 adjusting device
6 gap
7 agitator
8 force storage means
9 nozzle
10 source for at least one viscous liquid mixed with gas
11 source for at least one liquid curing or cross-linking agent
12 mixing chamber
13 end face
14 aperture
15 seal
16 shaft

The invention claimed is:

1. A mixing device comprising:
at least one feed opening for at least one liquid;
at least one further feed opening for at least one liquid curing or cross-linking agent, wherein the at least one liquid and/or the at least one liquid curing or cross-linking agent is or are mixed with a gas;
a discharge opening for discharge of a mixture which can be produced in the mixing device and comprises the at least one liquid and the at least one liquid curing or cross-linking agent; and
a pressure holding device for holding a predeterminable pressure which is greater than a pressure at which foaming-out of the gas in the mixing device occurs,
wherein the pressure holding device includes an adjusting member arranged displaceably in the mixing device relative to the discharge opening, the adjusting member being configured to adjust a gap remaining between the adjusting member and the discharge opening, wherein the mixing device has a rotating agitator for mixing the at least one liquid and the at least one liquid curing or cross-linking agent, wherein the adjusting member is biased in a direction of the discharge opening by a force storage member, and wherein the agitator is adapted to be displaceable and forms the adjusting member, and wherein the force storage member is in the form of a spring.

2. A mixing device comprising:
   at least one feed opening for at least one liquid;
   at least one further feed opening for at least one liquid curing or cross-linking agent, wherein the at least one liquid and/or the at least one liquid curing or cross-linking agent is or are mixed with a gas;
   a discharge opening for discharge of a mixture which can be produced in the mixing device and comprises the at least one liquid and the at least one liquid curing or cross-linking agent; and
   a pressure holding device for holding a predeterminable pressure which is greater than a pressure at which foaming-out of the gas in the mixing device occurs, wherein the pressure holding device includes an adjusting member arranged displaceably in the mixing device relative to the discharge opening, the adjusting member being configured to adjust a gap remaining between the adjusting member and the discharge opening, wherein the mixing device has a rotating agitator for mixing the at least one liquid and the at least one liquid curing or cross-linking agent, wherein the adjusting member is biased in a direction of the discharge opening by a force storage member, and wherein the agitator is adapted to be displaceable and forms the adjusting member,
   wherein the mixing device further comprises a mixing chamber, the mixing chamber having the discharge opening, the agitator being arranged within the mixing chamber, and
   wherein the agitator is configured to be displaced by a force of the at least one liquid and the at least one liquid curing or cross-linking agent in the mixing chamber applied directly to the agitator in a direction away from the discharge opening such that the force directly displaces the agitator away from the discharge opening so as to allow the mixture to be discharged through the discharge opening, and such that the force directly determines a size of the gap.

* * * * *